Feb. 9, 1932.  W. J. BINKLEY  1,844,269

CORRIDOR PARTITION WIREWAY

Filed Aug. 3, 1929

Inventor
William J. Binkley
By Williams, Bradbury, McCaleb & Hinkle
Attys.

Patented Feb. 9, 1932

1,844,269

UNITED STATES PATENT OFFICE

WILLIAM J. BINKLEY, OF CHICAGO, ILLINOIS

CORRIDOR PARTITION WIREWAY

Application filed August 3, 1929. Serial No. 383,206.

This invention relates to a wire-way for telephone wires or the like, and more particularly to an end fitting for a wire-way.

An object of the invention is to provide an improved wire-way for a cable or a group of wires.

A further object is to provide an end fitting for a wire-way in which access may readily be had to the ends of the wires.

A further object is to provide an end fitting for a wire-way, the end of which is slightly enlarged to provide a space for the ends of the wires.

A further object is to provide an end fitting which may be readily secured in position.

A further object is to provide an end fitting which is simple in construction and economical to produce.

Referring to the drawings.

Figure 1:
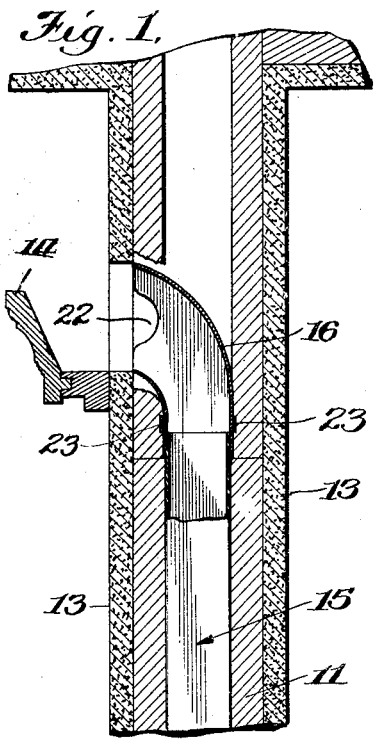
Fig. 1 is a longitudinal section of a wall showing a wire-way embodying the invention.

In the drawings a wall is shown constructed of hollow tiles 11 in which the holes in the superposed tiles form a longitudinal passage 12. The outside of the tiles is usually covered with a plaster coating 13. When a wall of this type is used to form the partition of a corridor, a wire molding 14 forming a trough along the wall is provided for conducting the telephone or other wires to various parts of the building.

In order to connect telephone instruments or the like to the wires, the wires may be brought down to the floor level through the longitudinal channel in the tiles. For this purpose a conduit 15 may be placed within the longitudinal channel in the tile during the construction of the building, or in some instances the channel may be used without providing a conduit 15 therein, in which case the channel itself serves as the conduit. The wires or cable are led from the molding 14 through an end fitting 16 into the conduit. The end fitting is placed in an aperture which may be chiseled through the side of a tile and leads through the plaster to the molding.

The end fitting comprises a front wall 17 and a rear wall 18, the surfaces of which are curved through an angle of substantially ninety degrees from one end of the wall to the other. A pair of end walls 19 are provided, the surfaces of which lie in a plane. In order to connect the walls of the end fitting, the front and rear walls are provided with flanges 21 which overlap the end walls and are secured thereto in any suitable manner, as, for instance, by welding. The end walls 19 are tapered so as to provide an enlarged opening at the exit end thereof.

Figure 2:
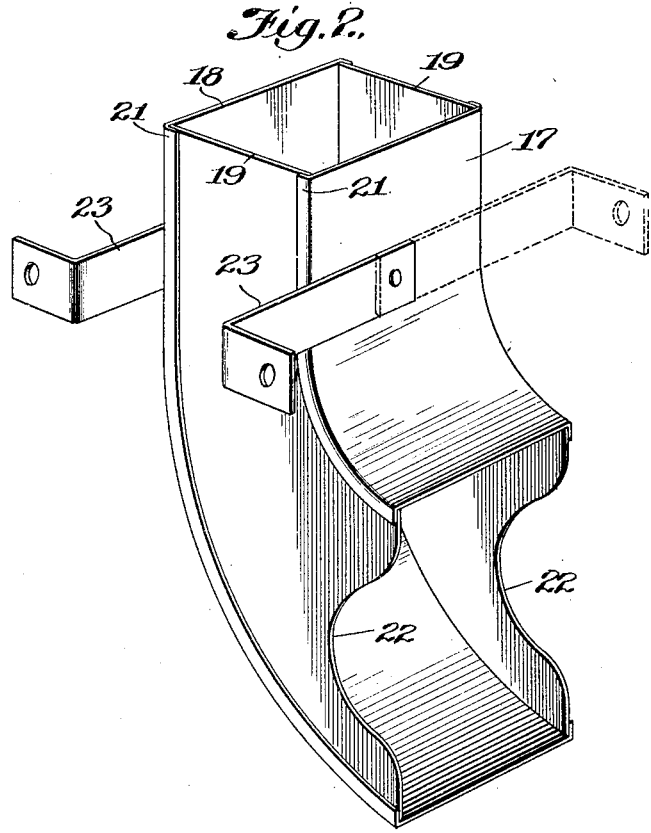
Fig. 2 is a detail perspective view of an end fitting embodying the invention.

It will be seen that as the wires or the cable is passed from the wire molding into the end fitting, the cable passes around a somewhat sharp corner, and in order to prevent the edge of the end walls 19 from cutting into the wires or cables, the ends of these walls are cut out as shown at 22. A pair of arms 23 are pivotally secured to the central point of the front and rear walls so that the arms may be moved to either side of the fitting as shown by the dotted lines in Fig. 2, depending upon which side of the conduit or end fitting the arms are to be secured to.

Figure 3:
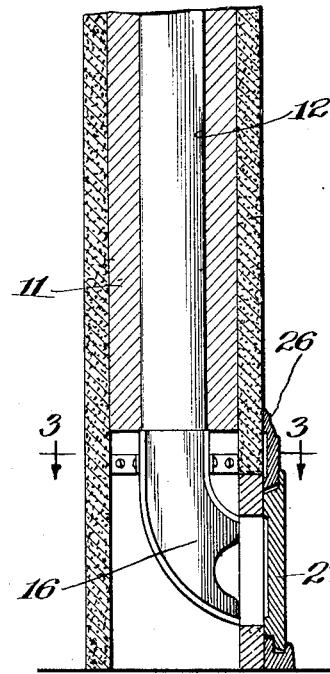
Fig. 3 is a cross sectional view taken on line 3—3 of Fig. 1.

The wire-ways are usually provided near a door. In Fig. 3 an end post 24 is shown to which the frame 25 of a door is secured by a plurality of screws as shown. The first channel through the tiles from the door will always be spaced a definite distance from the post 24 so that the arms 23 by being secured to the mid-point of the end fitting will always be of the proper length to support the end fitting at the end of the conduit. An aperture is provided in the end tile to allow the arms to extend from the conduit to the end post. At the lower end of the conduit the end fitting terminates at the baseboard 26, which is provided with an aperture normally closed by a cover plate 27 when no wires are led from the conduit into the room.

It will be noted that the exit end of the end fitting is larger than the opposite end. The wires of the cable from the conduit are long enough to project through the baseboard in order to be readily accessible. When, however, the wires are not led from the conduit into the room, they are pushed back into the enlarged end of the end fitting far enough to permit the cover plate 27 to be placed in the baseboard. This would not be possible if the end of the end fitting were not larger than the conduit.

Having described the nature and embodiments of my invention, what I desire to secure by United States Letters Patent is as follows:

1. In a device of the class described, an end member for a conduit in a wall comprising front and rear walls having surfaces curved through an angle of substantially ninety degrees, end walls having plane surfaces, and a pair of adjustable brackets, one connected to the front wall and one to the rear wall for securing the end member in position.

2. In a device of the class described, a sheet metal end member for a conduit forming an elbow, comprising a pair of metallic end walls having plane surfaces, a metallic front and rear wall having surfaces conforming with the contour of the lateral edges of the end walls, said front and rear walls having flanges overlapping the end walls and secured thereto to form a rectangular housing.

3. In a wire guiding device, an end fitting for a conduit comprising a front wall, a rear wall, and end walls forming an elbow, the end walls being tapered to provide a larger opening at one end of the fitting than at the other, one of said walls having a recessed end adjacent the larger opening to permit lateral access of wires to the conduit.

4. In a device of the class described, an end fittting for a conduit comprising an elbow for telescopic engagement with the conduit, an arm for the elbow, said arm being pivotally secured to a central point of the elbow whereby it may be shifted to either side of the elbow to secure the elbow in place.

5. A sheet metal elbow member for corridor partition wire-ways comprising front and rear wall portions having side flanges, flat side wall portions secured to said flanges, said front and rear wall portions curved through an angle of substantially 90°, said side walls tapered to provide a larger opening in one end of said elbow member and said side walls having their ends recessed adjacent the larger opening to permit lateral access to said elbow member.

6. A sheet metal elbow member for corridor partition wire-ways comprising front and rear wall portions having side flanges, flat side wall portions secured to said flanges, said front and rear wall portions curved through an angle of substantially 90°, said side walls tapered to provide a larger opening in one end of said elbow member and said side walls having their ends recessed adjacent the larger opening to permit lateral access to said elbow member, and reversible brackets secured to said elbow member for supporting the same in either an inverted or an upright position or from either side.

In witness whereof, I hereunto subscribe my name this 23rd day of May, 1929.

WILLIAM J. BINKLEY.